(12) United States Patent
Brodie (10) Patent No.: US 6,301,545 B1
(45) Date of Patent: Oct. 9, 2001

(54) GLOBAL POSITIONING SYSTEM TAG SYSTEM

(75) Inventor: Keith J. Brodie, Irvine, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/560,797

(22) Filed: Apr. 28, 2000

Related U.S. Application Data

(60) Provisional application No. 60/132,046, filed on Apr. 30, 1999.

(51) Int. Cl.[7] ............................ G01C 21/00; G01S 13/00; G06F 7/00; G06F 17/00; G06F 19/00
(52) U.S. Cl. ............................ 701/213; 701/213–216; 701/207; 342/457; 342/352; 342/357; 455/13.3; 455/255; 455/575; 455/259; 455/260
(58) Field of Search ............................ 701/213–216, 701/207; 342/357, 352, 457; 455/13.3, 255, 575, 259, 260

(56) References Cited

U.S. PATENT DOCUMENTS

| | | | |
|---|---|---|---|
| 5,781,156 | * 7/1998 | Krasner | 342/357 |
| 5,812,087 | 9/1998 | Krasner | 342/357 |
| 5,825,327 | 10/1998 | Krasner | 342/357 |
| 5,831,574 | 11/1998 | Krasner | 342/357 |
| 5,841,396 | 11/1998 | Krasner | 342/357 |
| 5,874,914 | 2/1999 | Krasner | 342/357 |
| 5,884,214 | 3/1999 | Krasner | 701/207 |
| 5,945,944 | 8/1999 | Krasner | 342/357 |
| 6,041,222 | 3/2000 | Horton et al. | 455/255 |
| 6,169,514 | * 1/2001 | Sullivan | 342/357.05 |
| 6,175,848 | * 1/2001 | Riley | 708/300 |
| 6,181,911 | * 1/2001 | Sih et al. | 455/12.1 |
| 6,195,041 | * 2/2001 | Gardner et al. | 342/357.12 |

* cited by examiner

Primary Examiner—William A. Cuchlinski, Jr.
Assistant Examiner—Ronnie Mancho
(74) Attorney, Agent, or Firm—Fulwider Patton Lee & Utecht, LLP (57) ABSTRACT

A communications system for determining the position and velocity of an object using a plurality of GPS signals transmitted by a plurality of GPS sources includes an interrogator remote from the object and responsive to the plurality of GPS signals. The interrogator transmitts an RF signal including GPS source information and at least one of frequency information and time and code phase information of at least one of the GPS signals. The system also includes a transponder positioned on the object and responsive to the RF signal and the plurality of GPS signals. The transponder tracks one of the plurality of GPS signals in response to the GPS source information and the frequency information and time and code phase information. The transponder generates a correlation snapshot and transmits the snapshot to the interrogator. The snapshot including a sampled coarse acquisition (C/A) code between the one of the plurality of GPS signals and a replica of the one of the plurality of GPS signals generated by the transponder at regular offsets of some fraction of a C/A code chip. The interrogator processes the correlation snapshot to determine the position and velocity of the transponder.

11 Claims, 3 Drawing Sheets

GLOBAL POSITIONING SYSTEM TAG SYSTEM

RELATED APPLICATION

This application claims the benefit of co-pending provisional application serial No. 60/132,046 filed on Apr. 30, 1999.

BACKGROUND OF THE INVENTION

1. Field of the Invention

This invention relates generally to a position measuring device and more particularly to a system that uses Global Positioning System (GPS) satellites to determine the position of an object.

2. Description of Related Art

It is often desirable to obtain the position and velocity of an object such as an unmanned vessel. Such objects or vessels include, for example, towed barges, aircraft and automobiles. With respect to a towed barge, the reasons for obtaining the position and velocity are clear—the safety of the waterways depends on knowledge of the location, course and speed of all vessels, manned or unmanned. To this end, the U.S. Coast Guard has addressed the need for situational awareness on the waterways through the Ports and Waterways Safety System (PAWSS), Vessel Traffic Services (VTS), and the Automated Identification System (AIS) transponder. Any AIS equipped vessel returns identification, location, course and speed data through the VTS to the Vessel Traffic Center (VTC) which displays the waterway traffic situation.

Through wireless DGPS receivers the position of barges can be reported to any interrogator in range. The interrogator can be the towing vessel, another manned vessel, or the VTC itself. The towing vessel can maintain precise knowledge of the position of its barges and relay that data to the VTC. A portable, self powered wireless DGPS receiver may be placed on each barge to be tracked. The receiver must operate unattended, for at least the duration of a voyage and preferably much longer, even indefinitely. The barge environment is low in vibration and dynamics, but the unit can be expected to be dropped and mishandled during transport. The RF environment will include VHF marine band activity, urban RF noise, and marine radar transmissions. Some blockage of GPS signals below 30° elevation could be expected, but the higher elevation satellites should be visible while the unit is operating on a barge. There will be multipath in the environment from the host barge, other barges and vessels, and shore facilities.

There are at least three current solutions available to provide a DGPS tag for a remote unpowered object such as a barge. All would require a battery system connected to existing technology such as a complete DGPS transponder, a GPS pseudorange transponder, or an RF sampling transponder.

A complete DGPS transponder consists of a GPS receiver and a DGPS beacon receiver integrated with a RF modem at the tag. The GPS receiver and the Beacon receiver must remain on continuously while the tag is deployed, waiting to be interrogated. Once the unit is interrogated, it must return a position report. This system for providing a DGPS tag for a remote unpowered object is undesirable in that all the equipment must be powered continuously. Thus the system consumes a large amount of power.

A GPS pseudorange transponder consists of a GPS receiver integrated with a RF modem. No beacon corrections are collected at the transponder. The receiver must remain on to have pseudoranges available on demand. When the unit is interrogated, it transmits the pseudoranges back to the towing vessel. DGPS corrections are collected and stored at the towing vessel, and applied to the received pseudoranges. The barge position calculation is completed at the towing vessel. This system also requires that the equipment remain powered continuously in order to provide measurements on demand.

A RF sampling transponder down converts and digitizes the L1 band signal and transmits the RF samples themselves. It does not need to remain on between interrogations. Processing the RF samples for code correlations is done entirely at the interrogator. While this application has the lowest power requirements, it must transfer large amounts of data which presents its own troubles in terms of complexity and reliability.

What has been needed and heretofore unavailable is a system with very low power requirements that is small and easy to deploy. The system should use a simple but reliable communication link and should minimize data transmission to further conserve power and reduce the possibility of transmission error.

SUMMARY OF THE INVENTION

Briefly, and in general terms, the present invention provides a system for, and a method of, determining the position and velocity of an object using a plurality of GPS signals transmitted by a plurality of GPS sources.

In a first aspect the invention is related to a communications system for determining at least one of position and velocity of an object. The system includes an interrogator and a transponder. The interrogator is remote from the object and responsive to the plurality of GPS signals. The interrogator transmits an RF signal comprising GPS source information and at least one of frequency information and time and code phase information of at least one of the GPS signals. The transponder is positioned on the object and is responsive to the RF signal transmitted by the interrogator and the plurality of GPS signals. The transponder tracks one of the plurality of GPS signals in response to the GPS source information and the at least one of frequency information and time and code phase information. The transponder generates a correlation snapshot and transmits the snapshot to the interrogator. The snapshot comprises a sampled coarse acquisition (C/A) code between the one of the plurality of GPS signals and a replica of the one of the plurality of GPS signals generated by the transponder at regular offsets of some fraction of a C/A code chip. The interrogator processes the correlation snapshot to determine the position and velocity of the transponder.

In a detailed aspect of the invention, the GPS source information comprises a pseudorandom noise (PRN) code number and the frequency information comprises at least one of a carrier frequency and a Doppler offset frequency. In another detailed aspect, the frequency information comprises the carrier frequency of the RF signal transmitted by the interrogator and the transponder comprises a local oscillator that is phase-locked, through aphase lock loop, to the carrier frequency. In other detailed facets of the invention the time and code phase information comprises an offset measurement in chips, the correlation snapshot includes a set of fixed-point correlator sums and a range of offset in chips and the correlation snapshot is obtained as the set of correlator outputs summed over an integration interval.

In a second aspect the invention involves a method for determining at least one of position and velocity of an object using a plurality of GPS signals transmitted by a plurality of GPS sources. The method includes the step of positioning an interrogator remote from the object. The interrogator being responsive to the plurality of GPS signals for determining GPS source information and at least one of frequency information and time and code phase information of at least one of the GPS signals. The method also includes the step of transmitting an RF signal comprising the GPS source information and the at least one of frequency information and time and code phase information of at least one of the GPS signals from the interrogator. Also included is the step of positioning a transponder comprising a plurality of correlators on the object. The transponder being responsive to the RF signal and the plurality of GPS signals for: tracking one of the plurality of GPS signals in response to the GPS source information and the at least one of frequency information and time and code phase information, generating a correlation snapshot and transmitting the snapshot to the interrogator. The snapshot comprises a sampled coarse acquisition (C/A) code between the one of the plurality of GPS signals and a replica of the one of the plurality of GPS signals generated by the transponder at regular offsets of some fraction of a C/A code chip. The method further includes the step of processing the correlation snapshot to determine at least one of position and velocity of the transponder.

In a detailed facet of the invention, the step of generating the correlation snapshot comprises the steps of obtaining a noncoherent sum of a plurality of integrations using the plurality of correlators spaced one chip apart; determining the approximate signal peak from the noncoherent sum; prepositioning the correlators at a code phase predicted from the signal peak and performing an integration with one-eighth chip correlator spacing to produce a plurality of correlator sums. In more detailed aspects the noncoherent sum is obtained by two, one millisecond integrations using twelve correlators spaced one chip apart and the plurality of correlator sums is produced by a ten millisecond integration.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
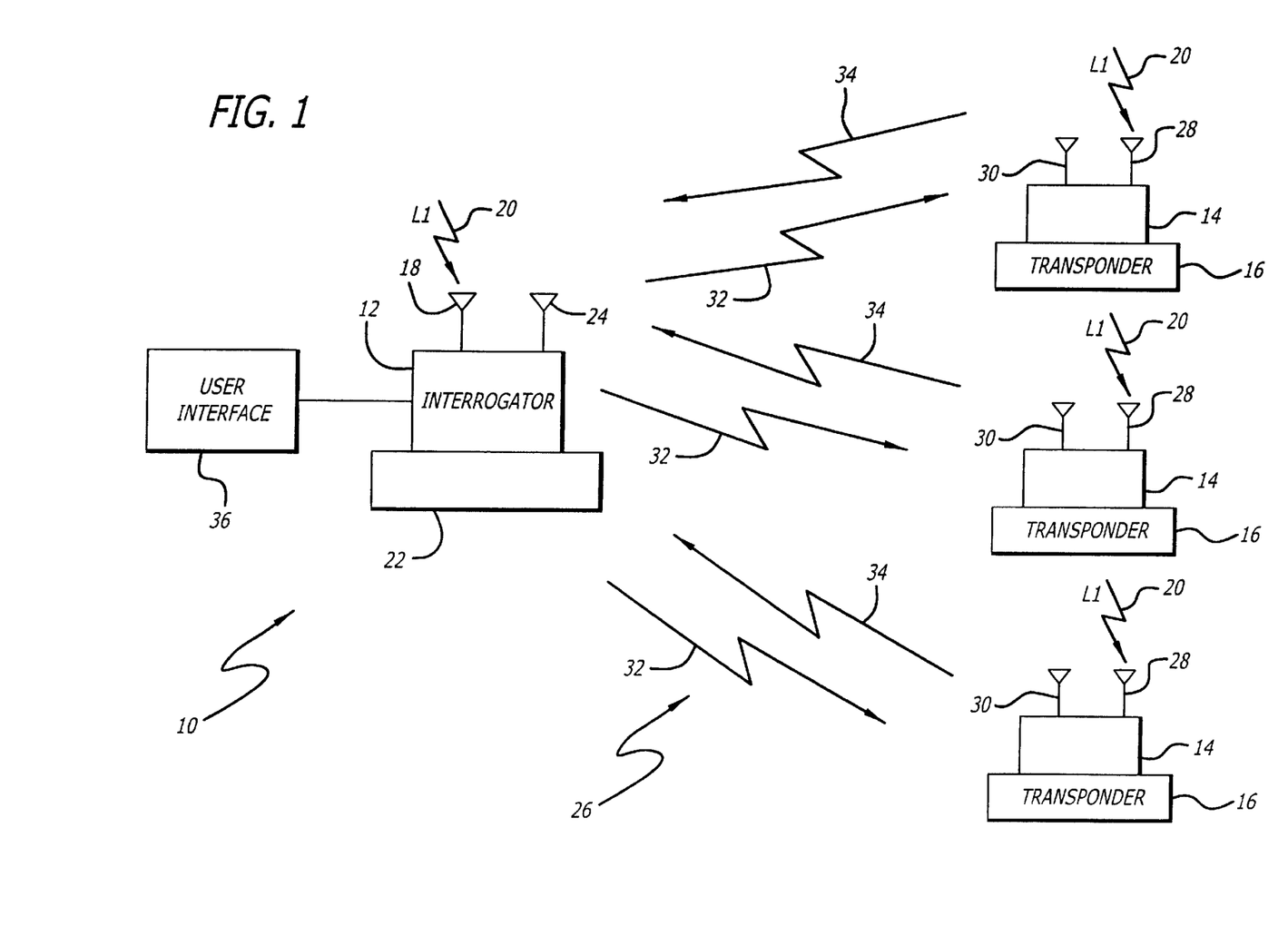
FIG. 1 is a functional block diagram of the GPS tag system showing the RF links and an interrogator communicating with a plurality of transponders.

Turning now to the drawings, in which like reference numerals are used to designate like or corresponding elements among several figures, in FIG. 1 there is shown a functional block diagram of a GPS tag system 10 in accordance with aspects of the present invention. The GPS tag system 10 may be used in various applications in which the position and velocity of an object 16 is desired to be known. The following description of the invention focuses on the use of the GPS tag system 10 as a means of tracking the position of a barge being towed by a towing vessel. The invention, however, is by no means limited to this application.

Returning to FIG. 1, the GPS tag system 10 includes an interrogator 12 located on a base object 22 and at least one transponder 14, also referred to herein as a "tag", placed on a remote object 16 where power may or may not be available. The interrogator 12 includes a receiving antenna 18 for receiving GPS signals 20 transmitted by one or more GPS sources, such as satellites. The interrogator 22 further includes a transceiving antenna 24 for communicating with the transponders 14. The transponders 14 also include a receiver antenna 28 for receiving GPS signals 20 and a transceiving antenna 30 for communicating with the interrogator 12. The interrogator 12 and transponders 14 transmit and receiver RF signals 26 back and forth. The content of these RF signals 26 is described below.

All messages from the interrogator 12 to transponder 14 start with a wake-up signal. This is an unmodulated carrier transmitted for approximately 10 milliseconds, possibly at a higher power than the rest of the message. The purpose of the wake-up signal is to alert all the transponders 14 in range that a message will follow. This message wakes the transponders 14 from their passive standby state. The remainder of the message is a sync pattern and an ID for the transponder 14 being polled. In the simplest embodiment, three interrogator-to-transponder messages are defined. One message is the broadcast to all transponders 14 to identify themselves, the second message is the acknowledge message to terminate the transponders 14 identification messages and finally there is the interrogation message 32, also referred to herein as a "correlation snapshot command message." In the case of the correlation snapshot command message 32, the sync pattern and ID are followed by pre-positioning data and a tracking signal.

Figure 3:
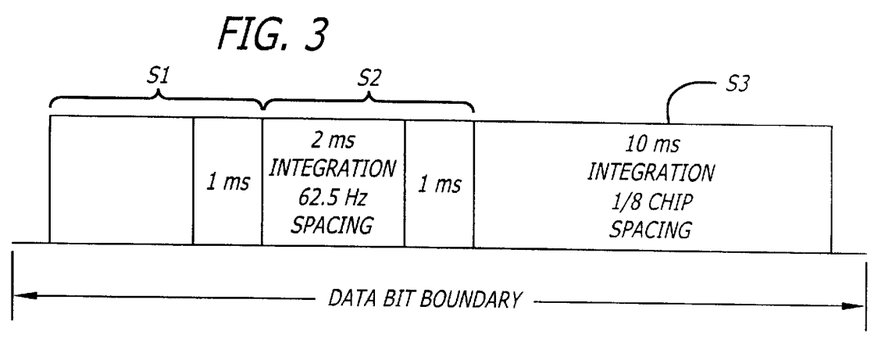
FIG. 3 is a timing diagram of a correlation snapshot with a single GPS data bit.

The entire process of taking a correlator snapshot and returning the data to the interrogator 12 takes on the order of 40 to 50 milliseconds. For a query rate of one Hz the transponder 14 is powered for only 50 milliseconds per second. This low duty cycle contributes to the reduction of power used by the GPS tag system 10, which in turn, greatly increases battery life, especially over known systems which require continuous power. The transponder's correlation snapshot command message 32 provides all of the information required for the transponder 14 to find the GPS signals and construct the correlation snapshots 34 for transmittal back to the interrogator 12. The correlation snapshot command message 32 data includes a PRN code number, chip number, and Doppler offset for each GPS signal source to be received. The correlation snapshot command message 32 is followed by a tracking signal to supply reference time and frequency information to the transponder 14. The frequency information is provided by the incoming carrier. The timing information comes from the code applied to the track signal. A short code sequence after the pre-positioning information will indicate the GPS data epoch. Each transponder 14 correlator channel should begin signal acquisition on the commanded code chip a fixed time after the data epoch occurs as shown in FIG. 3.

The GPS system 10 optimizes the division of processing between a tag 14 on a remote object such as a barge 16 and the interrogator 12 on abase object such as a towing vessel 22, to minimize transponder power drain. The present invention takes advantage of the fact that no information is displayed or used at the transponders 14 and therefore limits the transponder processing to collection of RF samples of GPS signals 20 and correlations against code replicas of the GPS signals.

As previously mentioned, the interrogator 12 transmits an RF signal comprising an interrogation message 32 to the transponders 14. In response, each of the transponders 14 on a barge 16 transmits an RF signal comprising a correlation snapshot 34 to the interrogator 12. Using the information contained in the correlation snapshot 34, the interrogator 12 performs the processing necessary to determine the pseudo-ranges and the navigational characteristics of the transponders 14 to provide the position and velocity of the object 16 upon which the transponder is placed.

With respect to a barge towing system, prior to beginning a voyage, a transponder 14 is placed on each barge 16 in a convoy. The transponders 14 are preferably placed on the highest flat metal surface available. The transponders 14 are manually switched from off to on once deployed on the barge 16. Once switched on, the transponder 14 is in a standby mode. As explained below, the transponder 14 includes a passive standby circuit that maintains the transponder in the standby mode until an interrogation message 32 is received.

After deployment of the transponders 14, the operator turns on the interrogator 12. Once powered up, the interrogator 12 begins acquiring GPS signals 20. The GPS tag system 10 also includes a user interface 36 which communicates with the interrogator 12. Through the user interface 36 an operator may select an IDENTIFY TAGS mode. When this mode is selected, the interrogator 12 sends a BPSK modulated identification request signal (not shown) which is received by all of the transponders 14. This request signal is separate and distinct from the interrogation message 32. Each transponder 14 transmits a response message (not shown) after an internally generated random delay. The transponder 14 response is on the same frequency and includes a 20 bit ID code BPSK modulated on the signal. The interrogator 12 acknowledges receipt of individual transponder 14 responses. Each transponder 14 continues the cycle of delaying a random time and transmitting its ID until it is acknowledged or reaches a timeout. Collisions of transponder response messages may occur, but the identification function still takes place because each transponder 14 continues to transmit until it is acknowledged by the interrogator 12. Once the transponder response messages are received, the user interface 36 then displays a list of all the transponders 14 in the convoy. The operator can assign custom names to any of the tags 14, by default they are marked with their five character hexadecimal ID codes. No two transponders 14 have the same ID code.

In one embodiment of the invention, the operator selects tracking mode on the interface 36 and selects a polling rate for updating the position of each transponder 14. The interrogator 12 begins a round robin polling of the transponders 14 and obtains a set of six satellite correlation snapshots 34 from each transponder. The interrogator 12 computes the tag 14 positions and displays them on the user interface 36. The GPS tag system 10 may also provide an alarm radius which sounds an alarm when any of the transponders 14 get more or less than a selected distance from the interrogator 12. The interrogator 12 may periodically send out the identification request message to see if any other transponders 14 are coming into range. As a first towing vessel navigates into a waterway occupied by a second towing vessel, transponders 14 from barges being towed by a second towing vessel may be responding to the interrogator 12 associated with the second towing vessel. The interrogator 12 associated with the first towing vessel may pick up these messages and plot the locations of the transponder as well. Alarms can be set by the operator for such conditions as new transponder 14 detection, minimum or maximum barge-to-barge range violation, maximum barge-to-towing range exceeding a limit, and missing barge responses.

At the destination, the barges 16 are tied up and the interrogator 12 is set to standby. The interrogator 12 GPS receiver remains on to support a quick start of the next voyage. Interrogation of the transponders 14 stops. The transponders 14 drop back into their standby mode automatically when not interrogated. As previously stated, when in the standby mode the transponder consumes less than a milliwatt of power.

Figure 2:
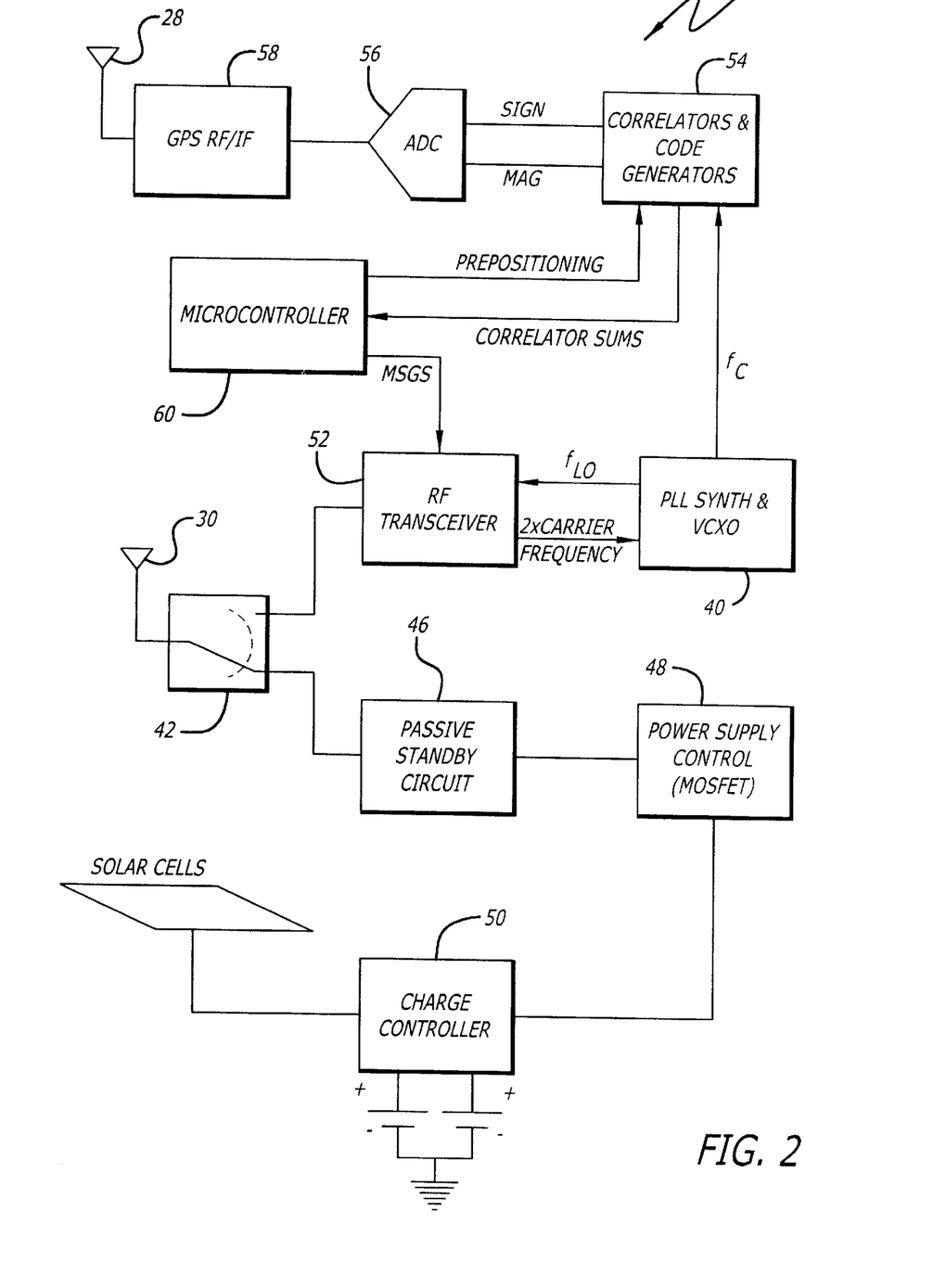
FIG. 2 is a schematic block diagram of a transponder of the GPS system of FIG. 1.

With reference to FIG. 2, the transponder 14 includes a power subsystem comprising an antenna switch 42, passive standby circuit 46, power supply control 48 and a solar powered charge controller 50. The antenna switch 42 is shown in its normally closed position, with the receiver 30 feeding the passive standby circuit 46. During periods of inactivity, the transponder 14 is essentially powered down with the receiver 30 feeding the passive standby circuit 46. The passive standby circuit 46 is a tuned filter that includes a precision diode detector, a low-pass filter, and a comparator that drive the gate signal of the MOSFET power supply control 48. An RF signal at the resonant frequency causes a build-up of the low-pass filter DC output voltage until it passes the threshold and triggers the comparator to switch on the power supply. The only current drawn in the standby mode is the bias current for the precision diode detector and the current drawn by the comparator in the off state. In most embodiments this should total less than 1 milliwatt, and it may be possible to bring it down to the tens of microwatts range with the proper diode detector design. The operation of this circuit varies with the band selected for GPS tag system communications. Low sensitivity of the detection circuit may be compensated for by increasing the power of the interrogation message 32 for the wake-up portion of the waveform only.

In another embodiment, in order to deduce the possibility of false triggering of the transponder 14, a more advanced passive standby circuit that relies on the presence of two tones above the noise background before triggering can be used. The advantage to this approach is the reduction in the false alarm rate and subsequent power savings. In this case the circuit is implemented with a triplet of passive tuned filter receivers. Two of these are used to detect continuous waves (CW) tones signals from the interrogator 12. The third is used to measure the noise and interference in the band of interest. The three output voltages are combined in a pair of comparators which controls the gate voltage of the power MOSFET. The third receiver channel performs the same function as an automatic gain control (AGC) in an active receiver, increasing the dynamic range of the standby mode receiver.

The transponder 14 further includes an RF transceiver 52, a phase-locked loop/voltage controlled oscillator (PLL/VCO) 40, correlators/code generators 54, an analog-to-digital converter (ADC) 56, a GPS RF-to-IF converter (GPS RF/IF) 58 and a microcontroller 60. Upon power up of the transponder 14, the antenna switch 42 switches to the closed position and the RF transceiver 52 receive signals from the interrogator 12. This signal may comprise an identification request signal, as previously described, or an interrogation message 32, also referred to herein as a "correlation snapshot command message." The PLL/VCO 40 is slaved to the carrier frequency on the incoming correlation snapshot command message 32 from the interrogator 12. This is done to provide the precise frequency information for coherent integration of the incoming GPS signals 20.

The transponder 14 squares the incoming BPSK signal to get the reference carrier that the VCO 40 is slaved to. The squaring wipes off the BPSK modulation. The PLL loop 40 locks onto the squared carrier while the pre-positioning information is being sent in the BPSK modulation. The interrogation message 32 includes at least a 20 millisecond tracking signal after the pre-positioning information which the oscillator remains locked to while a correlation snapshot is taking place.

The correlator 54 receives the carrier frequency from the PLL/VCO 40 and prepositioning information from the microcontroller 60. The correlator 54 performs correlation functions on GPS signals received by the antenna 28 and processed by the GPS RF/IF 58 and ADC 56. Correlation sums are provided to the microcontroller 60 and forwarded to the RF transceiver 52 for transmission, as a correlation snapshot, to the interrogator 12.

As previously mentioned, the transponder 14 (FIG. 1) is designed to transmit a correlation snapshot 34 back to the interrogator 12. The correlation snapshot 34 is the sampled coarse acquisition (C/A) code correlation function between the received GPS signal 20 and a replica generated at the tag 14 at regular offsets of some fraction of a chip over the range of at least a full chip. The correlation snapshot 34 is obtained as the set of correlator outputs summed over an integration interval and transmitted as a set of fixed point values. The correlation snapshot 34 is formed in response to an interrogation message 32 that establishes the code phase and frequency offset. A typical interrogation message 32 consists of the requested pseudorandom noise (PRN) code number, the code phase offset in chips and the Doppler frequency offset of the GPS signal 20. The transponder 14 responds with a set of fixed-point correlator sums and a range offset in chips. In one embodiment the correlation snapshot 34 comprises twelve correlator outputs of four bits each with each output representing an offset of one eighth of a chip. A GPS carrier lock is not obtained at the transponder 14 because the transponder does not remain on long enough to track the GPS carrier. Instead, precise GPS signal carrier frequency information is provided by the RF carrier from the interrogator 12, which allows for coherent integration without a GPS carrier tracking loop. The transponder 14 bandwidth and correlator spacing are sized to insure code phase noise less than one meter at one sigma.

In one embodiment, the correlator 54 of the transponder 14 contains seventy-two correlators grouped into six channels. Each channel uses its twelve correlators to take a correlation snapshot 34 of a single GPS signal 20. The correlation snapshot 34 takes place in three steps. With reference to FIG. 3, the first step S1 comprises a noncoherent sum of two, one millisecond integrations using the twelve correlators spaced one chip apart. The noncoherent sum is used to maintain a wider bandwidth than would be the case with a single coherent two millisecond integration. This locates the GPS signal 20 if the code phase prepositioning error is less than ±1758 meters and the carrier frequency prepositioning error is less than ±375 Hz.

In the second step S2 the twelve correlators are all prepositioned at the code phase predicted from the signal peak in step S1. Each correlator is separated from the next by the predicted Doppler frequency in 62.5 Hz intervals. A two millisecond integration is performed. The output of these correlators is compared at the end of step S2, and the Doppler frequency is predicted to within 31.25 Hz worst case for step S3. In step S3 the twelve correlators perform a ten millisecond integration with one-eighth chip correlator spacing. The correlator sums are normalized by the transponder microcontroller and sent back to the interrogator as a set of twelve, four-bit values along with the chip offset calculated in step S1.

The interrogator 12 analyzes the correlation snapshot 34 for multipath estimation and computation of the pseudorange. The narrow correlator spacing substantially eliminates some of the close-in multipaths by estimating primary and delayed rays at the interrogator 12. It is significant to note that the entire correlation snapshot 34 takes place within the space of one GPS data bit, or twenty milliseconds. The interrogator 12 signals the transponder 14 to start the correlation within a few milliseconds of the data bit boundary. Since the data bit is not decoding at the transponder 14, integrating across the data bit boundary is avoided to prevent potentially subtracting from the correlator sums.

In an alternative embodiment, the transponder 14 comprises only one channel with twelve correlators. In this embodiment the transponder 14 is sequentially polled to obtain correlation information for each GPS signal 20 in view by the interrogator 12. This has the advantage of simplifying the transponder 14 design while increasing only slightly the processing required at the interrogator 12.

In another alternative embodiment, the transponder 14 reduces the twelve correlator values taken over the 10 ms samples to a chip offset by fitting a triangular correlation function to the data points which represent the correlation curve thereby calculating the peak correlation position. This value can then be converted to a fixed point number and returned along with the initial whole chip offset calculated during step one which was the noncoherent sum of two, one millisecond integrations using the twelve correlators spaced one chip apart which established the whole chip offset. This embodiment has the advantage of returning even less data to the interrogator 12 or ten bits for a one meter resolution of the peak correlation position and 4 bits for the whole chip offset for a total of 14 bits of data per satellite or 84 bits for a six channel configuration.

In a preferred embodiment of the GPS tag system 10, the transponder 14 returns twelve, four bit correlator outputs per satellite to the interrogator 12. For six satellites, 288 bits are transmitted. This is sufficient for one meter pseudorange accuracy and allows the GPS tag system 10 to use multipath mitigation techniques.

Figure 4:
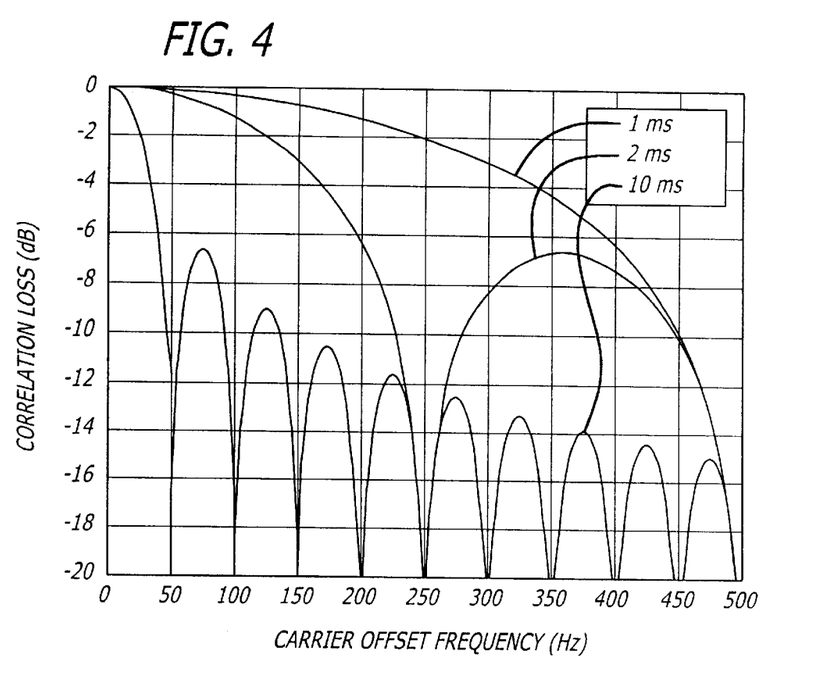
FIG. 4 is a graph of correlation loss vs. Doppler error for 1, 2, and 10 ms integrations.

In order to perform this signal detection and pseudorange measurement in a single GPS data bit, the transponder 14 must have precise frequency information. FIG. 4 shows the correlation loss for the one, two and ten millisecond integration intervals versus carrier frequency error. The Doppler pre-positioning data in the interrogation message 32 does not account for the frequency error in the transponder 14 clock, it is relative to the 1575.42 MHz nominal L1 frequency. The transponder 14 tracks the carrier frequency of the interrogation message 32 using the PLL/VCO 40 to set the frequency for the local code generator. This allows for precise frequency information to be transferred from the interrogator oscillator (not shown) contained within the interrogator 12. This in turn, allows the transponder 14 to get a ten millisecond correlation function measurement without local GPS carrier tracking loops or an expensive temperature compensated crystal oscillator (TCXO).

As shown in FIG. 4, to keep the correlation loss above −6 dB the initial frequency error for the 1 ms integrations of the correlation snapshot 34 must be less than ±375 Hz at L1, or ±0.238 ppm. This is achievable with the phase locked loop tracking the incoming interrogation signal 32. In the second step of the correlation snapshot, with 62.5 Hz Doppler spacing of the correlators, the system is able to determine the signal Doppler to within 31.25 Hz. Referring again to FIG. 4, this keeps the correlation loss above −2 dB for the ten millisecond integration.

When the interrogator 12 constructs an interrogation message 32 for the transponder 14 it predicts the code phase that the transponder will see. A C/A code chip is approximately 293 m in length. The transponder 14 samples the correlation function over twelve code chips in the summed one millisecond integration intervals. Twelve chips cover ±6 chips or about ±1758 meters of slant range uncertainty. Given that the interrogator 12 position is known from its own GPS receiver and that the transponder 14 must be within approximately one kilometer to be within communications range of the interrogator 12, the system 10 can predict the satellite slant range within ±1758 meters without any difficulty. Predicting the Doppler frequency observed by the transponder 14 on the barge 16 is also possible because the difference in GPS signal Doppler between the towing vessel 22 and the barge cannot be more than 30 m/s, or 0.1 ppm, which is well within the initial bandwidth of ±0.238 ppm.

Within the GPS tag system 10, the interrogator 12 acts as a central GPS receiver, by maintaining track of all the visible GPS satellites and remotely operating a set of slave correlators, i.e., the transponders 14. The interrogator 12 provides the precise phase and frequency information required at the tags 14 via the interrogation message 32 and has the only expensive oscillator in the system. The transponder 14 correlators integrate coherently without a GPS carrier tracking loop because the same GPS signal 20 is being tracked by the interrogator 12, which is prepositioning the transponder 14 at the correct Doppler offset. The transponders 14 sample the correlation function by integrating and summing the correlator outputs over the integration interval at each of the correlator taps and returning the scaled sums. The interrogator 12 uses the sampled correlation function to find a best-fit for the multipath-distorted correlation peak. The interrogator 12 can then determine the precise phase of the code in the transponder 14 and thereby recover the pseudorange to the satellite.

In a preferred embodiment of the GPS tag system 10, a two bit sampler is used to sample the data before the correlator. The use of a two bit sampler is significant. Most GPS receivers use one bit samplers to avoid the need for an automatic gain control (AGC) circuit. One bit samplers are prone to suffer from interference, particularly continuous wave (CW) interference. Every zero crossing of the CW interference flips the bit, thus "stealing" the A/D convertor. A two bit sampler with AGC control of the magnitude bit density provides a substantial margin against CW interference.

The GPS tag system 10 uses a custom communications waveform to support the transponder 14 design. The waveform is a BPSK modulated carrier. In one embodiment the communications link consists of a 19,200 bits per second on a 40.68 MHz carrier which is an industrial, scientific, medical (ISM) band. The selection of a VHF carrier frequency is not mandatory and the system could operate in UHF on the 915 MHz ISM band should that be desired, but the 40.68 MHz selection is convenient for the passive standby circuit design. A 100 mw transmission from the transponder 14 is sufficient for a one kilometer range at the VHF frequencies. In one embodiment the interrogator 12 is operated at 200 mw to reduce sensitivity requirements at the transponder 14.

Some additional applications for the GPS tag system 10 include positioning transponders 14 on skiers to locate them if they become lost, positioning transponders 14 on aircraft and ground vehicles taxiing around airports, so controllers have better information for preventing ground collisions, and positioning transponders 14 on golf carts to allow golf courses to track progress of play.

While several particular forms of the invention have been illustrated and described, it will also be apparent that various modifications can be made without departing from the spirt and scope of the invention. Accordingly, it is not intended that the invention be limited except as by the appended claims.

What is claimed is:

1. A method for determining at least one of position and velocity of an object using a plurality of GPS signals transmitted by a plurality of GPS sources, said method comprising the steps of:

positioning an interrogator remote from the object, the interrogator responsive to the plurality of GPS signals for determining GPS source information and at least one of frequency information and time and code phase information of at least one of the GPS signals;

transmitting an RF signal comprising the GPS source information and the at least one of frequency information and time and code phase information of at least one of the GPS signals from the interrogator;

positioning a transponder comprising a plurality of correlators on the object, the transponder responsive to the RF signal and the plurality of GPS signals for:

tracking one of the plurality of GPS signals in response to the GPS source information and the at least one of frequency information and time and code phase information; and generating a correlation snapshot by obtaining a non-coherent sum of a plurality of integrations using the plurality of correlators spaced one chip apart, determining the approximate signal peak from the non-coherent sum, prepositioning the correlators at a code phase predicted from the signal peak, and performing an integration with one-eighth chip correlator spacing to produce a plurality of correlator sums, the snapshot comprising a sampled coarse acquisition (C/A) code between the one of the plurality of GPS signals and a replica of the one of the plurality of GPS signals generated by the transponder at regular offsets of some fraction of a C/A code chip;

transmitting the snapshot to the interrogator; and processing the correlation snapshot to determine at least one of position and velocity of the transponder.

2. The method of claim 1 further comprising the step of normalizing the plurality of correlator sums.

3. The method of claim 1 wherein the noncoherent sum is obtained by two, one millisecond integrations using twelve correlators spaced one chip apart.

4. The method of claim 1 wherein the plurality of correlator sums is produced by a ten millisecond integration.

5. The method of claim 1 wherein the GPS source information comprises a pseudorandom noise (PRN) code number and the frequency information comprises at least one of a carrier frequency and a Doppler offset frequency.

6. The method of claim 5 wherein the frequency information comprises the carrier frequency of the RF signal transmitted by the interrogator and the transponder comprises a local oscillator that is phase-locked, through a phase lock loop, to the carrier frequency.

7. The method of claim 1 wherein the time and code phase information comprises an offset measurement in chips.

8. The method of claim 1 wherein the time information comprises the time of arrival of the RF signal at the transponder.

9. The method of claim 1 wherein the correlation snapshot includes a set of fixed-point correlator sums and a range of offset in chips.

10. The method of claim 9 wherein the correlation snapshot is obtained as the set of correlator outputs summed over an integration interval.

11. The method of claim 1 wherein the transponder comprises a plurality of correlators grouped into at least one channel, each channel responsible for generating a correlation snapshot of a single GPS signal.

* * * * *

UNITED STATES PATENT AND TRADEMARK OFFICE
CERTIFICATE OF CORRECTION

PATENT NO. : 6,301,545 B1
DATED : October 9, 2001
INVENTOR(S) : Keith J. Brodie

It is certified that error appears in the above-identified patent and that said Letters Patent is hereby corrected as shown below:

Title page,
U.S PATENT DOCUMENTS, add the following:
-- 6,178,379   1/2001   Dwyer --.

Signed and Sealed this

Fifth Day of March, 2002

Attest:

JAMES E. ROGAN
*Attesting Officer*    *Director of the United States Patent and Trademark Office*